(12) United States Patent
Nie

(10) Patent No.: US 11,360,355 B2
(45) Date of Patent: Jun. 14, 2022

(54) METHOD OF MANUFACTURING DISPLAY PANEL AND DISPLAY PANEL

(71) Applicant: WUHAN CHINA STAR OPTOELECTRONICS TECHNOLOGY CO., LTD., Wuhan (CN)

(72) Inventor: Xiaohui Nie, Wuhan (CN)

( * ) Notice: Subject to any disclaimer, the term of this patent is extended or adjusted under 35 U.S.C. 154(b) by 314 days.

(21) Appl. No.: 16/632,394

(22) PCT Filed: Nov. 6, 2019

(86) PCT No.: PCT/CN2019/115844
§ 371 (c)(1),
(2) Date: Jan. 20, 2020

(87) PCT Pub. No.: WO2021/035953
PCT Pub. Date: Mar. 4, 2021

(65) Prior Publication Data
US 2022/0050315 A1 Feb. 17, 2022

(30) Foreign Application Priority Data
Aug. 23, 2019 (CN) .......................... 201910781642.2

(51) Int. Cl.
| | | |
|---|---|---|
| *G02F 1/1337* | (2006.01) | |
| *B23K 26/382* | (2014.01) | |
| *B23K 26/06* | (2014.01) | |
| *B23K 26/402* | (2014.01) | |
| *G02F 1/13* | (2006.01) | |

(52) U.S. Cl.
CPC ........ *G02F 1/1337* (2013.01); *B23K 26/0626* (2013.01); *B23K 26/382* (2015.10); *B23K 26/402* (2013.01); *G02F 1/1303* (2013.01)

(58) Field of Classification Search
CPC .. B23K 26/0626; B23K 26/382; G02F 1/1303
See application file for complete search history.

(56) References Cited

U.S. PATENT DOCUMENTS

2014/0049731 A1* 2/2014 Park ...................... G02F 1/1334
349/88
2017/0059943 A1 3/2017 Lee et al.

FOREIGN PATENT DOCUMENTS

| | | | | |
|---|---|---|---|---|
| CN | 104570487 | A | 4/2015 | |
| CN | 106405886 | A | 2/2017 | |
| CN | 107229148 | A | 10/2017 | |
| CN | 207636882 | U | 7/2018 | |
| CN | 108594524 | A | 9/2018 | |
| CN | 108885376 | A | 11/2018 | |
| CN | 109031756 | A | * 12/2018 | ....... G02F 1/133512 |
| CN | 109031756 | A | 12/2018 | |
| CN | 109283722 | A | 1/2019 | |
| CN | 109557726 | A | * 4/2019 | ........... G02F 1/1339 |
| CN | 109557726 | A | 4/2019 | |
| CN | 208922027 | U | 5/2019 | |
| JP | 2007114361 | A | 5/2007 | |
| WO | 2019058106 | A1 | 3/2019 | |

* cited by examiner

*Primary Examiner* — Donald L Raleigh

(57) ABSTRACT

The invention provides a method of manufacturing a display panel and the display panel. The display panel is applied to a display device having a camera, and the display panel includes an alignment film layer, a liquid crystal layer, and a camera hole. The method includes: performing laser treatment to the alignment film layer to obtain a first light transmission hole and performing laser treatment to the liquid crystal layer to obtain a second light transmission hole. The method provided by the invention reduces a difference of amount of ambient light entering at different angles of the alignment film layer and the liquid crystal layer, and thereby improves imaging quality of the camera.

16 Claims, 1 Drawing Sheet

METHOD OF MANUFACTURING DISPLAY PANEL AND DISPLAY PANEL

FIELD OF INVENTION

The present invention relates to the field of display technology, and in particular, to a method of manufacturing a display panel and the display panel.

BACKGROUND OF INVENTION

Extremely high screen ratio and ultra-narrow bezel are current and future directions for the development of small and medium-sized display panels. A full screen with a camera hole is a solution for high screen ratio, which is a focus of research and development for current mobile phone panel manufacturers.

A position of the camera hole is a position where the front camera is mounted. Thus, in the design of the camera hole screen, the thin film transistor (TFT) and the color filter (CF) substrate film layer at the position of the camera hole are especially designed to ensure light transmittance and prevent affecting the imaging quality of the front camera. However, in a cell process, regardless of whether it is a thin film transistor (TFT) substrate or a color filter (CF) substrate, the positions of the camera hole and non-camera hole are all subjected to processes of alignment film printing, liquid crystal dropping, liquid crystal alignment, and the like. Therefore, the presence of the alignment film layer and the liquid crystal layer causes a difference in the refractive index of the position of the camera hole, and a color difference occurs in the visual or photo-alignment environment, affecting imaging quality of the front camera.

TECHNICAL PROBLEM

In the cell process, regardless of whether it is a TFT substrate or a CF substrate, the positions of the camera hole and non-camera hole are all subjected to processes of alignment film printing, liquid crystal dropping, liquid crystal alignment, and the like. Therefore, the presence of the alignment film layer and the liquid crystal layer causes a difference in the refractive index of the position of the camera hole, and a color difference occurs in the visual or photo-alignment environment, affecting imaging quality of the front camera.

SUMMARY OF INVENTION

The invention provides a method of manufacturing a display panel and the display panel. The objective is to improve the structure of the display panel, and reduces the difference in the entering amount of the ambient light at different angles for the positions of the alignment film layer and the liquid crystal layer corresponding to the camera hole, and thereby improves an imaging quality of the camera.

The method of manufacturing a display panel provided by the present invention adopts laser to process the alignment film layer and the liquid crystal layer in the camera hole of the display panel to remove the alignment film layer and the liquid crystal layer in the camera hole of the display panel, a first light transmission hole and a second light transmission hole at positions corresponding to the camera hole of the alignment film layer and the liquid crystal layer are formed, respectively. It reduces the difference in the entering amount of the ambient light at different angles for the positions of the alignment film layer and the liquid crystal layer corresponding to the camera hole, and thereby improves the imaging quality of the camera.

In a first aspect, the present application provides a method of manufacturing a display panel applied to a display device having a camera. The display panel includes an alignment film layer, a liquid crystal layer, and a camera hole corresponding to the camera. The method includes: performing laser treatment to a position of the alignment film layer corresponding to a position of the camera hole to obtain a first light transmission hole; and performing laser treatment to a position of the liquid crystal layer corresponding to a position of the camera hole to obtain a second light transmission hole.

Alternatively, the alignment film includes a first alignment film layer and a second alignment film layer. The first alignment film layer is disposed opposite to the second alignment film layer. The liquid crystal layer is disposed between the first alignment film and the second alignment film.

Alternatively, the step of performing laser treatment to the position of the alignment film layer corresponding to the camera hole to obtain a first light transmission hole includes:

irradiating the position of the alignment film layer corresponding to the camera hole with a laser of predetermined energy to remove a portion of the alignment film layer corresponding to the position of the camera hole to obtain the first light transmission hole.

Alternatively, the step of irradiating the position of the alignment film layer corresponding to the camera hole with the laser of predetermined energy to remove the portion of the alignment film layer corresponding to the position of the camera hole to obtain the first light transmission hole includes:

forming a first spot on the portion of the alignment film layer corresponding to the position of the camera hole using a laser beam with a first energy value, the first spot with the first energy value destroying a molecular structure of the alignment film layer to remove the portion of the alignment film corresponding to the camera hole to form the first light transmission hole.

Alternatively, a magnitude of the first energy value is modulated based on material and thickness of the alignment film layer.

Alternatively, the step of performing laser treatment to the position of the liquid crystal layer corresponding to the camera hole to obtain the second light transmission hole includes:

irradiating the position of the liquid crystal layer corresponding to the camera hole with a laser of predetermined energy to remove a portion of the liquid crystal layer corresponding to the position of the camera hole to obtain the second light transmission hole.

Alternatively, the step of irradiating the position of the liquid crystal layer corresponding to the camera hole with the laser of predetermined energy to remove the portion of the liquid crystal layer corresponding to the position of the camera hole to obtain the second light transmission hole includes:

forming a second spot on the portion of the liquid crystal layer corresponding to the position of the camera hole using a laser beam with a second energy value, the second spot with the second energy value destroying a molecular structure of the liquid crystal layer to remove the portion of the liquid crystal corresponding to the camera hole to form the second light transmission hole.

Alternatively, a magnitude of the second energy value is modulated based on material and thickness of the liquid crystal layer.

Alternatively, the laser forms a first spot on the alignment film layer, and an area of the first spot is equal to an area of the first light transmission hole; the laser forms a second spot on the liquid crystal layer, and an area of the second spot is equal to an area of the second light transmission hole.

The area of the first spot and the area of the second spot are both equal to an area of the camera hole.

Alternatively, the first light transmission hole and the second light transmission hole are both through holes.

Alternatively, an area of the first light transmission hole is equal to an area of the second light transmission hole.

Alternatively, the laser forms a third spot on the alignment film layer, an area of the third spot is smaller than an area of the camera hole, and the step of performing laser treatment to the position of the alignment film layer corresponding to the camera hole to obtain the first light transmission hole includes:

performing laser treatment to the alignment film layer a plurality of times to obtain the first light transmission hole.

Alternatively, the step of performing laser treatment to the alignment film layer a plurality of times to obtain the first light transmission hole includes:

controlling a laser of preset energy to move in a first irradiation region corresponding to the position of the camera hole on the alignment film layer to remove the alignment film layer of the first irradiation region to obtain the first light transmission hole.

Alternatively, an area of the third spot is smaller than an area of the first irradiation region.

Alternatively, the laser forms a fourth spot on the liquid crystal layer, an area of the fourth spot is smaller than the area of the camera hole; and the step of performing laser treatment to the position of the liquid crystal layer corresponding to the camera hole to obtain the second light transmission hole includes:

performing laser treatment to the liquid crystal layer a plurality of times to obtain the second light transmission hole.

Alternatively, the step of performing laser treatment to the liquid crystal layer a plurality of times to obtain the second light transmission hole includes:

controlling the laser to move in a second irradiation region corresponding to the position of the camera hole on the liquid crystal layer to remove the liquid crystal layer of the second irradiation region to obtain the second light transmission hole.

In a second aspect, the present application further provides a display panel applied to a display device having a camera. The display panel includes an alignment film layer, a liquid crystal layer, and a camera hole corresponding to the camera. The alignment film layer includes a first light transmission hole, and the first light transmission hole is disposed corresponding to the camera hole. The liquid crystal layer includes a second light transmission hole, and the second light transmission hole is disposed corresponding to the camera hole.

Alternatively, the first light transmission hole and the second light transmission hole are both through holes.

Alternatively, an area of the first light transmission hole is equal to an area of the second light transmission hole.

Alternatively, the alignment film includes a first alignment film layer and a second alignment film layer. The first alignment film layer is disposed opposite to the second alignment film layer. The liquid crystal layer is disposed between the first alignment film layer and the second alignment film layer.

BENEFICIAL EFFECT

The method of manufacturing a display panel according to an embodiment of the present invention processes an alignment film layer and a liquid crystal layer in the camera hole of the display panel by laser, forming a first light transmission hole and a second light transmission hole at the positions of the alignment film layer and the liquid crystal layer corresponding to the camera hole, respectively. It reduces the difference in the amount of ambient light entering at different angles for the positions of the alignment film layer and the liquid crystal layer corresponding to the camera hole, and thereby improves an imaging quality of the front camera.

DESCRIPTION OF DRAWINGS

In order to more clearly illustrate the technical solutions in the embodiments of the present invention, the drawings used in the embodiments will be briefly described below. It is obvious that the drawings in the following description are only some embodiments of the present invention, and those skilled in the art can obtain other drawings according to the drawings without any creative work.

DETAILED DESCRIPTION OF PREFERRED EMBODIMENTS

Figure 1:
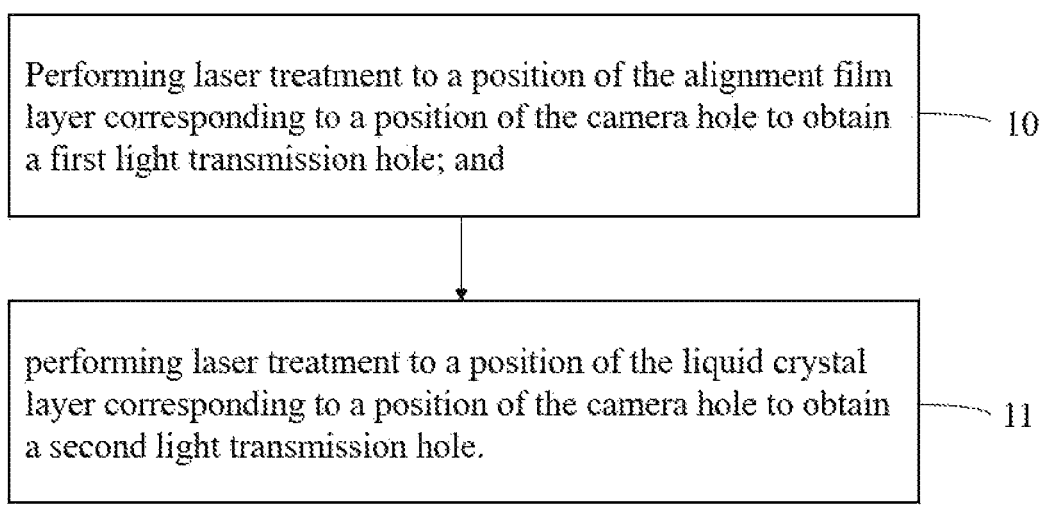
FIG. 1 is a flow chart of an embodiment of a method for manufacturing a display panel according to the present invention.

The technical solutions in the embodiments of the present invention are clearly and completely described in the following with reference to the accompanying drawings in the embodiments of the present invention. It is obvious that the described embodiments are only a part of the embodiments of the invention, and not all of the embodiments. All other embodiments obtained by a person skilled in the art based on the embodiments of the present invention without creative efforts are within the scope of the present invention.

In the description of the present invention, it is to be understood that the orientational or positional relationship of the terms "center", "longitudinal", "transverse", "length", "width", "thickness", "upper", "lower", "front", "back", "left", "right", "vertical", "horizontal", "top", "bottom", "inside", "outside", etc. is based on the orientational or positional relationship shown in the drawings. They are only for the convenience of describing the present invention and a brief description instead of indicating or implying that the device or component referred to must have a particular orientation or be constructed and operated in a particular orientation. Therefore, it should not be construed as limiting the invention. In addition, the terms "first" and "second" are used for descriptive purposes only and are not to be construed as indicating or implying a relative importance or implicitly indicating the number of technical features indicated. Thus, features defining "first" or "second" may include one or more of the described features either explicitly or implicitly. In the description of the present invention, the meaning of "a plurality" is two or more unless specifically defined otherwise.

In the present application, the word "exemplary" is used to mean "serving as an example, instance, or illustration." Any embodiment described in this application as "exemplary" is not necessarily to be construed as preferred or advantageous over other embodiments. The following description is presented to enable any person skilled in the art to achieve and use the invention. In the following description, details are set forth for the purpose of explanation. It will be appreciated that one skilled in the art will recognize that the invention can be practiced without the specific details. In other embodiment, well-known structures and procedures are not described in detail to avoid unnecessary detail. Therefore, the present invention is not intended to be limited to the embodiments shown but is in accordance with the broad scope of the principles and features disclosed herein.

An embodiment of the present invention provides a method of manufacturing a display panel and a display panel. The details are described below separately.

The display panel provided by the present invention is applied to a display device having a camera. The display panel includes an alignment film layer, a liquid crystal layer, and a camera hole corresponding to the camera, and the camera hole is positioned at the non-display area of the display panel.

Specifically, in the display panel, the alignment film layer includes a first alignment film layer and a second alignment film layer, the first alignment film layer is disposed opposite to the second alignment film layer, and the liquid crystal layer is disposed between the first alignment film layer and the second alignment film layer.

Shown in FIG. 1 is a flow chart of an embodiment of a method for manufacturing a display panel provided by the present invention, the method includes:

10, performing laser treatment to a position of the alignment film layer corresponding to a position of the camera hole to obtain a first light transmission hole; and 11, performing laser treatment to a position of the liquid crystal layer corresponding to a position of the camera hole to obtain a second light transmission hole.

Specifically, performing laser treatment to the position of the alignment film layer corresponding to the position of the camera hole to obtain a first light transmission hole includes:

irradiating the position of the alignment film layer corresponding to the camera hole with a laser of predetermined energy to remove a portion of the alignment film layer corresponding to the position of the camera hole to obtain the first light transmission hole.

Specifically, forming a first light spot on the portion of the alignment film layer corresponding to the position of the camera hole using a laser beam with a first energy value, the first light spot with the first energy value can destroy a molecular structure of the alignment film layer to remove the portion of the alignment film layer corresponding to the camera hole to form the first light transmission hole. Since a portion of the alignment film layer is separated from the camera hole, a thickness of the alignment film layer corresponding to the camera hole is thinned. Thus, the light from the outside can penetrate the camera hole more, and the display effect of the display panel is improved.

In the above embodiment, a magnitude of the first energy value is modulated based on material and thickness of the alignment film layer. Moreover, an area of the first light spot formed by the laser beam having the first energy value is equal to an area of the first light transmission hole.

On the basis of the above embodiments, the method also processes the liquid crystal layer of the display panel. Specifically, performing laser treatment to a position of the liquid crystal layer corresponding to a position of the camera hole to obtain a second light transmission hole.

In the above embodiment, forming a second light spot on the portion of the liquid crystal layer corresponding to the position of the camera hole using a laser beam with a second energy value, the second light spot with the second energy value can destroy a molecular structure of the liquid crystal in the liquid crystal layer to separate the portion of the liquid crystal layer from the camera hole to form the second light transmission hole. Since a portion of the liquid crystal layer is separated from the camera hole, a thickness of the liquid crystal layer corresponding to the camera hole is thinned. Thus, the light from the outside can penetrate the camera hole more, and the display effect of the display panel is improved.

In the above embodiment, a magnitude of the second energy value is modulated based on material and thickness of the liquid crystal layer. Moreover, an area of the second light spot formed by the laser beam having the second energy value is equal to an area of the second light transmission hole.

It should be noted that, in the above embodiment, the magnitude of the first energy value and the magnitude of the second energy value may be the same or different. The magnitudes of the first energy value and the second energy value are modulated based on material and thickness of the film layer. An area of the first light transmission hole is equal to an area of the second light transmission hole, and an area of the first light spot and an area of the second light spot are both equal to an area of the camera hole.

In some embodiments of the present invention, the first light transmission hole and the second light transmission hole can be through holes, that is, the first light transmission hole penetrates the entire alignment film layer, and the second through hole penetrates the entire liquid crystal layer.

Figure 2:
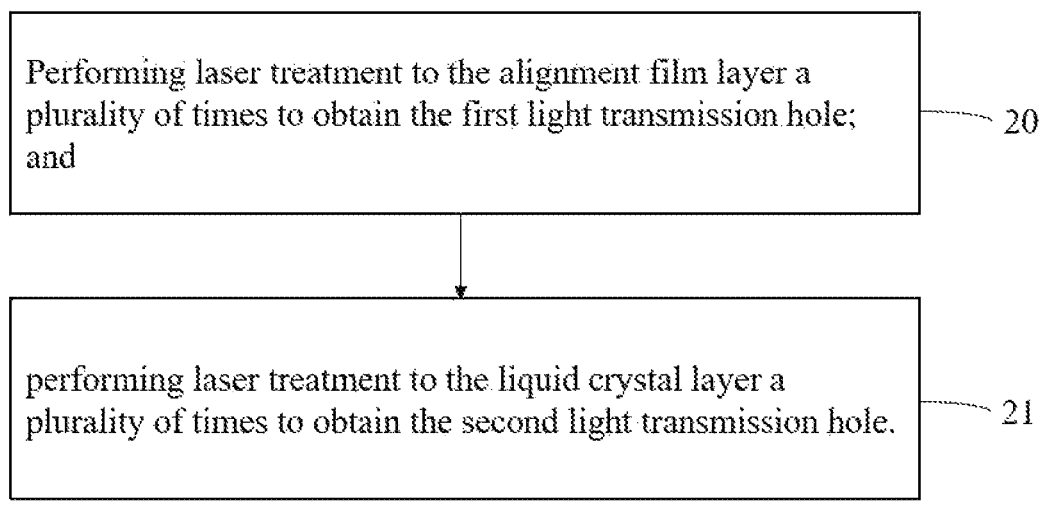
FIG. 2 is a flow chart of an embodiment of the present invention for obtaining a first light transmission hole on an alignment film layer and a second light transmission hole on a liquid crystal layer.

As shown in FIG. 2, the present invention provides a flow chart of an embodiment in which a first light transmission hole is obtained on an alignment film layer and a second light transmission hole is obtained on a liquid crystal layer, including:

20, performing laser treatment to the alignment film layer a plurality of times to obtain the first light transmission hole; and 21, performing laser treatment to the liquid crystal layer a plurality of times to obtain the second light transmission hole.

In a specific embodiment of the present invention, the step of performing laser treatment to the alignment film layer a plurality of times to obtain the first light transmission hole includes:

controlling a laser of preset energy to move in a first irradiation region corresponding to the position of the camera hole on the alignment film layer to remove the alignment film layer of the first irradiation region to obtain the first light transmission hole.

Specifically, a laser beam having a third energy value forms a third light spot in the first irradiation region corresponding to the position of the camera hole on the alignment film layer. The third light spot has a third energy value, which can destroy the molecular structure in the alignment film layer, and at the same time, a portion of the alignment film layer in the first irradiation region is separated from the camera hole to form a first light transmission hole.

On the basis of the above embodiments, the laser having the third energy value forms a third light spot on a portion of the alignment film layer corresponding to the position of the camera hole. An area of the third light spot is smaller than an area of the camera hole, and is smaller than an area of the first irradiation region corresponding to the position of the camera hole on the alignment film layer.

Since the area of the third light spot is smaller than the area of the camera hole, and is smaller than the area of the first irradiation region corresponding to the position of the camera hole on the alignment film layer, it is necessary to control the laser beam to move in the first irradiation region, and to irradiate the first irradiation region a plurality of times, so that the area of the first light transmission hole formed can be equal to the area of the camera hole.

The step of performing laser treatment to the liquid crystal layer a plurality of times to obtain the second light transmission hole may include:

controlling the laser to move in a second irradiation region corresponding to the position of the camera hole on the liquid crystal layer to remove the liquid crystal layer of the second irradiation region to obtain the second light transmission hole.

Specifically, the laser beam having the fourth energy value forms a fourth light spot in the second irradiation region corresponding to the position of the camera hole on the liquid crystal layer. The fourth light spot has a fourth energy value, which can destroy the molecular structure in the liquid crystal layer, and at the same time, the portion of the liquid crystal layer in the second irradiation region is separated from the camera hole to form a second light transmission hole.

On the basis of the above embodiment, a laser having a fourth energy value forms a fourth light spot on a portion of the liquid crystal layer corresponding to the position of the camera hole. The fourth light spot has a fourth energy value, which can destroy the molecular structure in the liquid crystal layer, and at the same time, the portion of the liquid crystal layer in the second irradiation region is separated from the camera hole to form a second light transmission hole. An area of the fourth light spot is smaller than an area of the camera hole, and is smaller than an area of the second irradiation region corresponding to the position of the camera hole on the liquid crystal layer.

Since the area of the fourth light spot is smaller than the area of the camera hole, and is smaller than the area of the second irradiation region corresponding to the position of the camera hole on the liquid crystal layer, it is necessary to control the laser beam to move in the second irradiation region, and to irradiate the second irradiation region a plurality of times, so that the area of the second light transmission hole formed can be equal to the area of the camera hole.

It should be noted that the magnitudes of the third energy value and the fourth energy value are modulated according to the thicknesses and materials of the alignment film layer and the liquid crystal layer in the display panel. Thus, the film layer is processed better. The first light transmission hole and the second light transmission hole can be through holes, that is, the first light transmission hole completely penetrates the entire alignment film layer, and the second light transmission hole completely penetrates the entire liquid crystal layer.

The invention further provides a display panel applied to a display device having a camera, the display panel includes an alignment film layer, a liquid crystal layer, and a camera hole corresponding to the camera; the alignment film layer includes a first light transmission hole disposed corresponding to the camera hole, and the liquid crystal layer includes a second light transmission hole disposed corresponding to the camera hole.

In the display panel provided by the present invention, the alignment film layer and the liquid crystal layer in the camera hole of the display panel are processed by laser to form the first light transmission hole and the second light transmission hole at the positions of the alignment film layer and the liquid crystal layer corresponding to the camera hole, respectively. It reduces the difference in the amount of ambient light entering at different angles for the positions of the alignment film layer and the liquid crystal layer corresponding to the camera hole, and thereby improves imaging quality of the front camera.

It should be noted that only the above structure is described in the foregoing display panel embodiment. It is to be understood that, in addition to the above structure, in the display panel of the embodiment of the present invention, any other necessary structure may be included as needed. For example, a substrate, a buffer layer, an interlayer dielectric layer (ILD), etc., are not specifically limited herein.

In the foregoing embodiments, the descriptions on which they focused are different, and the details of one embodiment may be referred to the details of the other embodiment, and are not described herein.

In specific implementation, each of the above components or structures may be implemented as a separate entity. Any combination can also be implemented as the same or several entities. For the specific implementation of the above various components or structures, please refer to the foregoing method embodiments, and details are not described herein.

The method of manufacturing a display panel and the display panel provided by the embodiments of the present invention are described in detail above. The principles and implementations of the present invention are described herein with specific embodiments. The above description of the embodiments is merely for assisting in understanding the method of the present invention and its core ideas. In the meantime, those skilled in the art may modify the specific embodiments and application scope according to the idea of the present invention, the content of the specification should not be construed as limiting the invention.

What is claimed is:

1. A method of manufacturing a display panel, the display panel applied to a display device having a camera, and the display panel comprising an alignment film layer, a liquid crystal layer, and a camera hole corresponding to the camera, the method comprising:

performing laser treatment to a position of the alignment film layer corresponding to a position of the camera hole to obtain a first light transmission hole; and performing laser treatment to a position of the liquid crystal layer corresponding to the position of the camera hole to obtain a second light transmission hole.

2. The method of manufacturing the display panel according to claim 1, wherein the alignment film layer comprises a first alignment film layer and a second alignment film layer, the first alignment film layer and the second alignment film layer are disposed opposite to each other, and the liquid crystal layer is disposed between the first alignment film layer and the second alignment film layer.

3. The method of manufacturing the display panel according to claim 1, wherein the step of performing laser treatment to the position of the alignment film layer corresponding to the camera hole to obtain the first light transmission hole comprises:

irradiating the position of the alignment film layer corresponding to the camera hole with a laser of predetermined energy to remove a portion of the alignment film layer corresponding to the position of the camera hole to obtain the first light transmission hole.

4. The method of manufacturing the display panel according to claim 3, wherein the step of irradiating the position of the alignment film layer corresponding to the camera hole with the laser of predetermined energy to remove the portion of the alignment film layer corresponding to the position of the camera hole to obtain the first light transmission hole comprises:

forming a first light spot on the portion of the alignment film layer corresponding to the position of the camera hole using a laser beam with a first energy value, and the first light spot with the first energy value destroying a molecular structure of the alignment film layer to remove the portion of the alignment film layer corresponding to the camera hole to form the first light transmission hole.

5. The method of manufacturing the display panel according to claim 4, wherein a magnitude of the first energy value is modulated based on a material and a thickness of the alignment film layer.

6. The method of manufacturing the display panel according to claim 1, wherein the step of performing laser treatment to the position of the liquid crystal layer corresponding to the camera hole to obtain the second light transmission hole comprises:

irradiating the position of the liquid crystal layer corresponding to the camera hole with a laser of predetermined energy to remove a portion of the liquid crystal layer corresponding to the position of the camera hole to obtain the second light transmission hole.

7. The method of manufacturing the display panel according to claim 6, wherein the step of irradiating the position of the liquid crystal layer corresponding to the camera hole with the laser of predetermined energy to remove the portion of the liquid crystal layer corresponding to the position of the camera hole to obtain the second light transmission hole comprises:

forming a second light spot on the portion of the liquid crystal layer corresponding to the position of the camera hole using a laser beam with a second energy value, and the second light spot with the second energy value destroying a molecular structure of the liquid crystal layer to remove the portion of the liquid crystal corresponding to the camera hole to form the second light transmission hole.

8. The method of manufacturing the display panel according to claim 7, wherein a magnitude of the second energy value is modulated based on a material and a thickness of the liquid crystal layer.

9. The method of manufacturing the display panel according to claim 1, wherein the laser forms a first light spot on the alignment film layer, and an area of the first light spot is equal to an area of the first light transmission hole; and the laser forms a second light spot on the liquid crystal layer, an area of the second light spot is equal to an area of the second light transmission hole, and the area of the first light spot and the area of the second light spot are both equal to an area of the camera hole.

10. The method of manufacturing the display panel according to claim 1, wherein the first light transmission hole and the second light transmission hole are both through holes.

11. The method of manufacturing the display panel according to claim 1, wherein an area of the first light transmission hole is equal to an area of the second light transmission hole.

12. The method of manufacturing the display panel according to claim 1, wherein the laser forms a third light spot on the alignment film layer, an area of the third light spot is smaller than an area of the camera hole, and the step of performing laser treatment to the position of the alignment film layer corresponding to the camera hole to obtain the first light transmission hole comprises:

performing laser treatment to the alignment film layer a plurality of times to obtain the first light transmission hole.

13. The method of manufacturing the display panel according to claim 12, wherein the step of performing laser treatment to the alignment film layer the plurality of times to obtain the first light transmission hole comprises:

controlling a laser of predetermined energy to move in a first irradiation region corresponding to the position of the camera hole on the alignment film layer to remove the alignment film layer of the first irradiation region to obtain the first light transmission hole.

14. The method of manufacturing the display panel according to claim 13, wherein the area of the third light spot is smaller than an area of the first irradiation region.

15. The method of manufacturing the display panel according to claim 12, wherein the laser forms a fourth light spot on the liquid crystal layer, an area of the fourth light spot is smaller than the area of the camera hole, and the step of performing laser treatment to the position of the liquid crystal layer corresponding to the camera hole to obtain the second light transmission hole comprises:

performing laser treatment to the liquid crystal layer a plurality of times to obtain the second light transmission hole.

16. The method of manufacturing the display panel according to claim 15, wherein the step of performing laser treatment to the liquid crystal layer the plurality of times to obtain the second light transmission hole comprises:

controlling the laser to move in a second irradiation region corresponding to the position of the camera hole on the liquid crystal layer to remove the liquid crystal layer of the second irradiation region to obtain the second light transmission hole.

\* \* \* \* \*